United States Patent [19]

Hart et al.

[11] Patent Number: 5,068,945
[45] Date of Patent: Dec. 3, 1991

[54] FASTENER

[75] Inventors: Richard S. Hart, Elgin; Thomas E. Perdue, Jr., Crystal Lake, both of Ill.

[73] Assignee: Duraco Products, Inc., Streamwood, Ill.

[21] Appl. No.: 547,055

[22] Filed: Jul. 2, 1990

[51] Int. Cl.$^5$ .................................................. B65D 77/10
[52] U.S. Cl. ............................. 16/114 B; 16/DIG. 24; 383/13; 383/26
[58] Field of Search ............... 16/114 B, 120, 108, 16/109, DIG. 24, DIG. 15, 2, 125; 383/13, 17, 25, 26; 24/683, 698.1, 100; 174/65 G, 152 G, 153 G

[56] References Cited

U.S. PATENT DOCUMENTS

| | | | |
|---|---|---|---|
| 1,155,248 | 9/1915 | Kleebauer | 383/26 |
| 1,268,500 | 6/1918 | Schlegel | 16/125 |
| 2,248,328 | 7/1941 | Bechik | 16/114 B |
| 3,213,745 | 10/1965 | Dwyer | 174/153 G |
| 3,768,115 | 10/1973 | Hoffmann et al. | 16/2 |
| 4,856,570 | 8/1989 | Rushing | 383/13 |
| 4,967,451 | 11/1990 | Boyn | 383/25 |

FOREIGN PATENT DOCUMENTS

| | | | |
|---|---|---|---|
| 0222807 | 9/1968 | Sweden | 383/13 |
| 1067176 | 5/1967 | United Kingdom | 383/13 |
| 1079683 | 8/1967 | United Kingdom | 383/13 |

Primary Examiner—Richard K. Seidel
Assistant Examiner—J. Miner
Attorney, Agent, or Firm—John L. Schmitt

[57] ABSTRACT

A fastener particularly adapted for securing an end of a cord in an opening in an object comprises a cylindrical shaped body. Extending through the fastener body is a passageway to hold an end of the cord, for example. In practice, the fastener preferably is made of plastic allowing the fastener to be molded onto the cord. Projecting outwardly on an angle from an inner end of the fastener body is an ear. Because the cord, the fastener ear, or both are flexible, the fastener ear and cord may be pressed into alignment. Once aligned, the fastener and cord end may be threaded through the opening in the object with the ear then returning to its prior non-aligned position. The cord is prohibited from being drawn back through the opening by an interference fit between the fastener ear and the object.

7 Claims, 2 Drawing Sheets

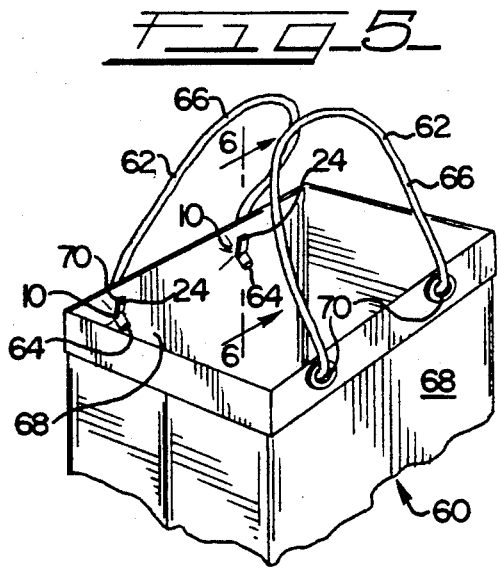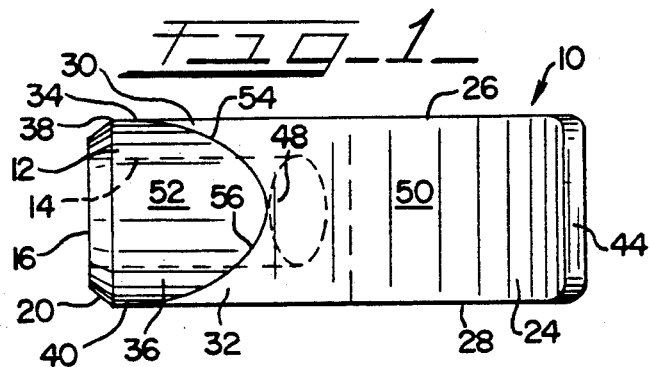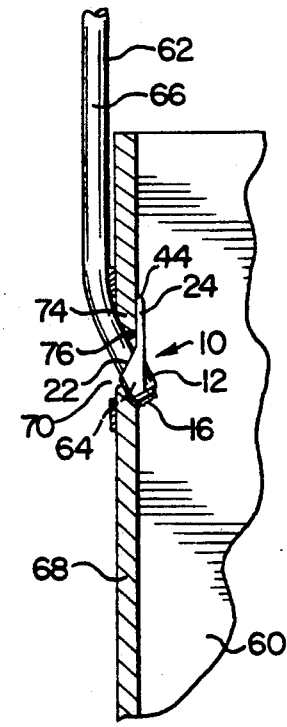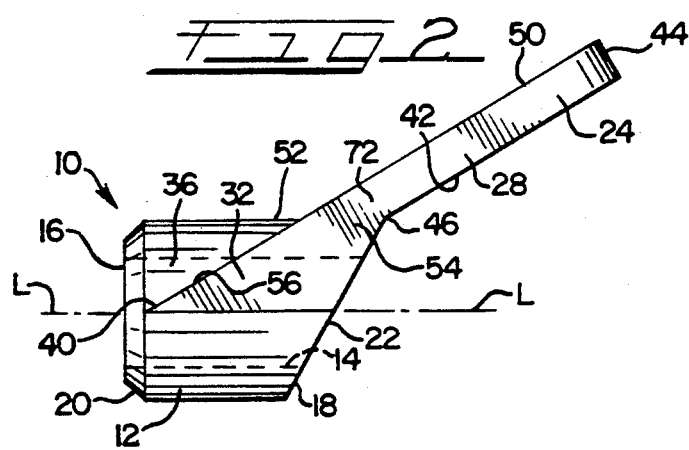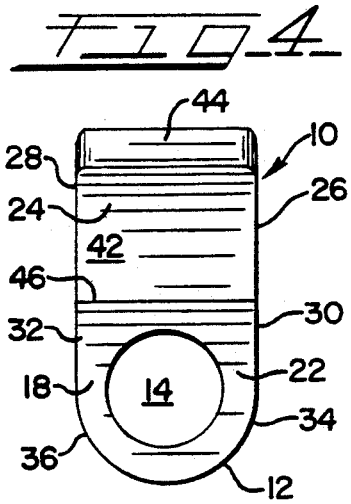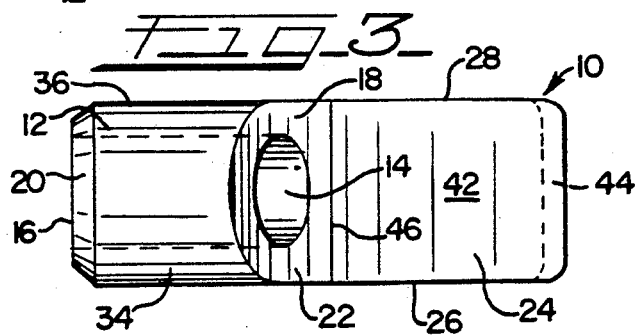

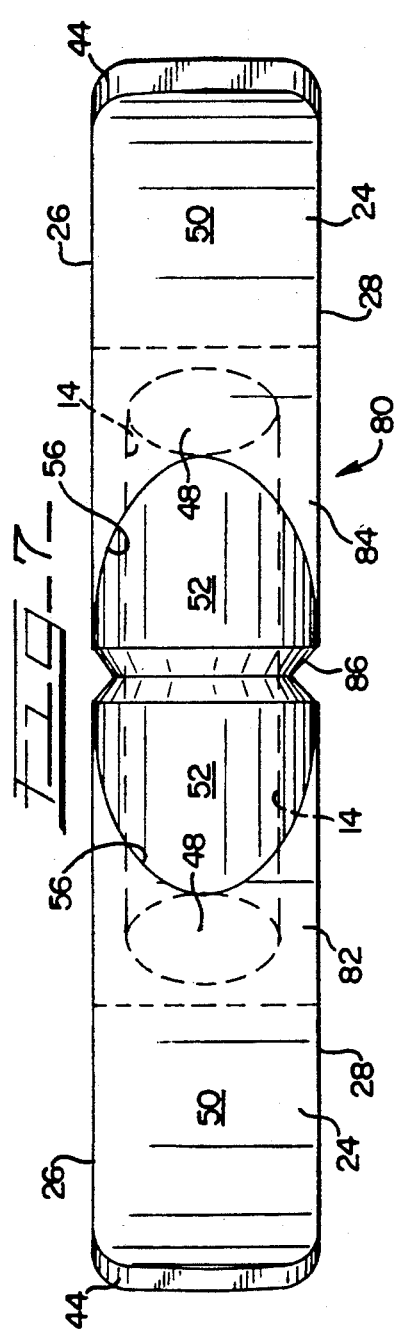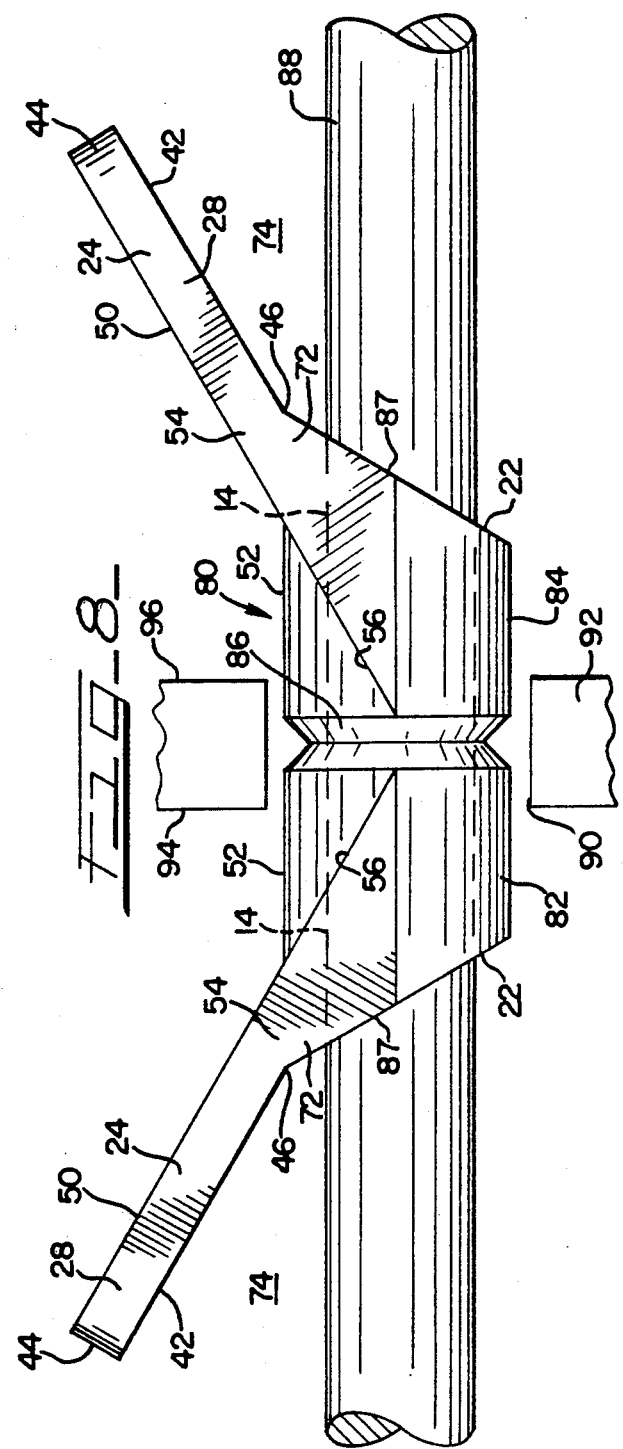

FASTENER

BACKGROUND OF THE INVENTION

1. Field of Invention

This invention relates to fastening devices and more particularly to a fastener for securing an end of a length of cord-like material to an object or like structural member.

2. Prior Art

Means for fastening a length of cord-like material to an object are well known and have been in use for many years.

One early cord fastening arrangement is set forth in U.S. Pat. No. 1,512,228. As disclosed, a pair of cord sections first are each formed to have an open-end loop. Respective ends of the cords sections next are placed under a bottom panel of a bag where these ends are overlapped and attached to the bag with a suitable mastic. The cord sections then are folded upward so that the looped end of each cord section extends above a top edge of the bag to form a handle. A reinforcing strip is used to join the pairs of cord sections to the bag top edge.

U.S. Pat. No. 3,201,028 discloses a handle comprising a pair of spaced apart locking tabs formed on ends of a center strip. As shown, the handle may be made of plastic as one piece. Each locking tab includes a pair of inwardly projecting ears. These ears are spaced on each side and adjacent to wings formed on each side of the strip end. For use the locking tabs of each handle are forced through respective spaced apart die cuts made in a sidewall of the bag. After insertion the locking tabs are rotated so that the locking tab ears may form an interference fit with the bag sidewall. As positioned, the center strip of each handle forms an arcuate shaped gripping section.

A still further shopping bag handle is set out in U.S. Pat. No. 3,456,865. This handle includes a center gripping section for carrying a box-shaped container. Integrally formed on each end of the center gripping section is a semi-circular shaped tab. These end tabs may be secured in spaced openings formed by overlapping ends of arcuate shaped slots formed respectively in a top front panel and a top rear panel of the container.

SUMMARY OF THE INVENTION

A fastener of this invention for attaching, for example an end of a length of cord-like material to an object, has a cylindrical shaped body formed with an inner passageway. This passageway extends between an inner and outer end of the body. The inner end is defined in part by an angularly positioned end wall. The cord is secured in the passageway. The fastener, preferably made of plastic, may be molded onto the cord. Alternately, the fastener may be formed independent of the cord length. In this latter case the length, for example an electrical conduit or structural cable, may be threaded through the fastener passageway. The position of the fastener on the length then may be adjusted and affixed as required.

The fastener further includes an ear that is integrally joined to the inner end of the body. This ear also is positioned on an angle. Between the cord and the ear is a holding space. The ear includes lower sidewall extensions that are joined to respective sides of the fastener body.

During use the object to which the cord length is to be attached is formed with an opening. The cord and fastener ear then may be aligned by pressing the ear and cord together. This alignment may be readily made in that the cord typically is flexible and the fastener ear, when made of plastic, is resilient. Upon alignment the fastener and encased cord may be threaded through the opening in the object. After insertion the fastener ear springs away from the cord to reform the holding space. Withdrawal of the cord is inhibited by an interference fit between the object and the fastener ear wherein a portion of the object about the opening may seat in the holding space. The fastener and cord may be disconnected from the object by reversing this procedure.

The fastener of this invention provides several advantages over other like devices.

A first advantage is where the fastener is made of plastic the fastener may be molded onto the cord. When so molded, a highly secure connection is formed therebetween. As the fastener material cools after ejection from the mold, the material shrinks to form a compressive fit about the cord. Where strands of the cord are open to provide recesses, the connection is further enhanced by molten plastic flowing into these recesses to form an integral-like structure. Alternately, the fastener may be formed with an open passageway and the cord length subsequently threaded therethrough.

A further advantage is the ease in which the fastener allows the cord length to be attached to and then disconnected from an object or other structural member. This ease of assembly is in part a result of the resiliency of the fastener ear. This resiliency is enhanced by the angular position of the body end wall which reduces a cross sectional thickness of a connection between the ear and the body. Additionally, this angularly positioned end wall allows the cord, when pressed into alignment with the ear, to bend about a larger radius. Where the fastener is used to hold a less flexible length, for example electrical conduit, this larger radius bend reduces the possibility that this deformation would produce a permanent set in the conduit.

DESCRIPTION OF THE DRAWINGS

FIG. 1 is a plan view of a fastener of this invention.

FIG. 2 is a side elevational view of the fastener of FIG. 1,

FIG. 3 is a bottom view of the fastener of FIG. 1.

FIG. 4 is an end elevational view of the fastener of FIG. 1.

FIG. 5 is a perspective view of a shopping bag which includes a pair of cord handles. Each handle comprises a pair of FIG. 1 fasteners attached to respective ends of a length of cord.

FIG. 6 is a cross sectional view as seen generally along the line 6—6 of FIG. 5.

FIG. 7 is a plan view of another configuration of the fastener of this invention.

FIG. 8 is side elevational view of the fastener of FIG. 7 showing the fastener in use.

DESCRIPTION OF THE PREFERRED EMBODIMENT

A fastener of this invention is shown generally in FIGS. 1–4 and designated 10. The fastener 10 comprises a body 12 having a cylindrical shape and formed with an inner passageway 14. The passageway 14 extends a length of the body 12 to connect an outer end 16 and an inner end 18. The outer end 16 has a peripheral beveled edge 20. The inner end 18 is defined by an angularly positioned end wall 22.

Attached to the fastener body inner end 18 is an angularly positioned ear 24. This ear 24 may be formed integrally as part of the body 12. With respect to a longitudinal axis L—L of the fastener body, see FIG. 2, the degree of angularity of the end wall 22 is proximately twice as great as the degree of angularity of the ear 24.

The ear 24 has spaced apart sidewalls 26,28 that include lower extensions 30,32. These lower extensions 30,32 connect with respective sides 34,36 of the fastener body 12. Each lower extension 34,36 is tapered to form an apex 38,40 located next to the outer end beveled edge 20. A bottom surface 42 of the ear 24 extends from a tip 44 of the ear 24 to connect with an upper end 46 of the end wall 22. A middle part 48 of a top surface 50 of the ear 24 in turn extends from the ear tip 44 to connect with an upper surface 52 of the fastener body 12. These joinders form a connection 54 defined in part by an inside corner edge 56 that extends to each apex 38,40 and has a parabolic-like shape, see FIG. 1.

FIGS. 5 and 6 show a shopping bag 60 which is fitted with a pair of cord handles 62. Each handle 62 includes a pair of the fasteners 10 attached to ends 64 of a length 66 of cord. Note that the cord ends 64 are secured respectively in the passageways 14 of the fasteners 10 so that the ears 24 of both fasteners 10 project inward. Each sidewall 68 of the bag 60 is formed with a pair of eyelet reinforced openings 70. The size of these openings 70 is only slightly greater than a size of the fastener body 12.

To insert the fastener 10 through the opening 70, the ear 24 and the cord 66 are pressed together to align the ear 24 and the cord 66. This alignment may be readily completed for several reasons. First, as the fastener 10 is made of plastic, the ear 24 is resilient. Secondly, ear resilience is enhanced by the angular position of the end wall 22 of the fastener 10. As positioned, the upper end 46 of the end wall 22 reduces a thickness of a cross section 72 of the connection 54 between the ear 24 and the body 12. Additionally, the ear sidewall lower extensions 30,32 act to increase the effective length of the ear 24 to further reduce ear stiffness while at the same time increasing ear strength. Lastly, ear-cord alignment is still further enhanced by the angular position of the end wall 22. As located, this end wall 22 allows the cord 66 to form a large radiused arc when bent.

Once insertion is complete, the ear 24 and the cord 66 again separate and reform a holding space 74 between the ear 24 and the cord 66. As seen in detail in FIG. 6, the ear 24 of the fastener 10 then may form an interference fit 76 with the bag sidewall 68 wherein a portion of the bag sidewall 68 adjacent to the opening 70 seats in the reformed holding space 74.

In FIGS. 7 and 8 another configuration of a fastener of this invention is shown generally and designated 80. The fastener 80 includes a pair of body portions 82,84 connecting at a center groove 86. Note the fastener 80 may be formed by joining the outer ends 16 of two fasteners 10. Likewise two fasteners 10 may be formed from one fastener 80 by severing the body portions 82,84 at the groove 86. In this case the beveled edge 20 of each fastener 10 is formed from the divided groove 86. Because of this likeness and symmetry, like reference numbers are used to identify like structure of the fastener 80 as were used to identify the structure of the fastener 10. This like structure need not again be described in detail. One exception is the passageway 14 of the fastener 80 which extends between spaced apart, angularly positioned outer end walls 87.

Note further that a series of the handles 62 may be formed from a continuous cord onto which a series of the fasteners 80 has been molded set intervals. For example, if a length 88 as seen in FIG. 8 were assumed to be a continuous cord with further fasteners 80 molded thereon, then severing each fastener 80 and the encased cord 88 at the groove 86 would produce a series of handles 62.

Alternately, as seen in FIG. 7, the fastener 80 may be made with a cord-free passageway 14 and maintained in its "as-molded" configuration as shown. Then, as seen in FIG. 8, the fastener 80 may be located in an opening 90 in a structural member 92 using the procedure discussed above. In this case the ears 24 of the fastener body portions 82, 84 are positioned on respective sides 94, 96 of the opening 90. The fastener 80 in FIG. 8 is inhibited from moving by interference between the ears 24 and the opening 90. Then, assuming the length 88 is in this case electrical conduit, this conduit may be threaded through the passageway 14 of the fastener 80. Also note that the length 88 may be threaded through the passageway 14 before the fastener 80 is inserted in the structural member opening 90. Regardless of the exact step sequence, the fastener 80 may act in part as a grommet to inhibit any damage causing interaction between length 88 and the structural member 92.

While embodiments, uses and advantages of this invention have been shown and described, it should be understood that this invention is limited only by the scope of the claims. Those skilled in the art will appreciate that various modifications or changes may be made without departing from the scope and spirit of the invention, and these modifications or changes may result in further uses and advantages.

What we claim is:

1. A fastener comprising:
    a body,
    an inner passageway extending between a first end and a second end of said body, said second end defined in part by an end wall positioned on an angle to extend upward and outward, said inner passageway extending through said end wall, and
    an ear joined to said body above said second end with said ear positioned on an angle to project upward and outward therefrom,
    wherein during a use of said fastener a cord section is secured in said passageway of said fastener, and said securing fastener then is inserted through an opening in a structural member to connect said cord section to said member by said fastener ear forming an interference fit with said member.

2. A fastener as defined by claim 1 and further characterized by,
    the degree of angularity of said end wall with respect to a longitudinal axis of said body being about twice as great as the degree of angularity of said ear with respect to said axis.

3. A fastener as defined by claim 1 and further characterized by,
    said ear having sidewalls formed with lower extensions joined to respective sides of said fastener body.

4. A fastener as defined by claim 3 and further characterized by,
    each said sidewall extension being tapered to form an apex positioned next to said fastener first end.

5. A fastener as defined by claim 1 and further characterized by,
   said ear joining said fastener body to form a connection having a cross section reduced at a position of an upper end of said end wall, and
   said connection forming a parabolic-like shaped inside corner edge at a joinder of a top surface of said ear with an upper surface and sides of said body.

6. A fastener comprising:
   a pair of like, tubular shaped body portions joined at a center connection,
   an inner passageway extending between outer ends of said body portions, and
   a pair of spaced apart ears formed respectively on said outer end of each said body portion, each said ear positioned on an angle to locate a tip of each said ear above and beyond its respective body portion outer end,
   wherein during a use of said fastener said center connection of said fastener body portions is located in an opening in a structural member and maintained therein by a compressive fit between said fastener ears and said member, and a length of cord then is disposed in said fastener passageway to maintain said cord and said structural member in a damage resistant relationship.

7. A fastener-cord unit particularly adapted to function as a handle for a shopping bag, said unit comprising:
   a central gripping section made of a flexible cord-like material,
   a pair of fasteners attached respectively to ends of said gripping section, each said fastener having a body formed with an inner passageway securing said gripping section end and an ear joined to and projecting outward on an angle from an inner end of said fastener body to form a holding space between a bottom surface of said ear and said griping section,
   said ear defined in part by spaced apart, lower sidewall extensions joined respectively to sides of said body with each said extension tapering to terminate at an outer end of said body, and
   said ear joining said body to form a connection having a cross sectional thickness reduced at an upper end of an angularly positioned end wall of said body inner end,
   wherein during use said unit is attached to said shopping bag by pressing each said fastener ear and said gripping section together to align said ear and said section, respectively threading said fasteners through openings in a sidewall of said bag, and then allowing said ears to separate from said gripping section to seat said bag sidewall in said unit holding spaces to affix said unit to said bag.

* * * * *